US010183710B2

(12) United States Patent
Zuidberg

(10) Patent No.: US 10,183,710 B2
(45) Date of Patent: Jan. 22, 2019

(54) COMBINATION OF A DRIVE WHEEL AND A GEARBOX FOR A CONTINUOUS TRACK SYSTEM

(71) Applicant: Zuidberg Techniek Holding B.V., Ens (NL)

(72) Inventor: Jeroen Emiel Zuidberg, Ens (NL)

(73) Assignee: ZUIDBERG TECHNIEK HOLDING B.V., Ens (NL)

( * ) Notice: Subject to any disclaimer, the term of this patent is extended or adjusted under 35 U.S.C. 154(b) by 280 days.

(21) Appl. No.: 15/140,799

(22) Filed: Apr. 28, 2016

(65) Prior Publication Data
US 2016/0325793 A1 Nov. 10, 2016

(30) Foreign Application Priority Data

May 8, 2015 (NL) ...................................... 2014781

(51) Int. Cl.
| | | |
|---|---|---|
| *B62D 55/125* | (2006.01) | |
| *B60K 17/04* | (2006.01) | |
| *B62D 55/04* | (2006.01) | |
| *F16H 1/46* | (2006.01) | |

(52) U.S. Cl.
CPC .......... *B62D 55/125* (2013.01); *B60K 17/046* (2013.01); *B62D 55/04* (2013.01); *B60K 17/043* (2013.01); *B60Y 2200/25* (2013.01); *F16H 1/46* (2013.01); *F16H 2200/2007* (2013.01)

(58) Field of Classification Search
CPC ............................... B60K 17/046; B62D 55/04
See application file for complete search history.

(56) References Cited

U.S. PATENT DOCUMENTS

| | | | | |
|---|---|---|---|---|
| 4,116,293 | A | | 9/1978 | Fukui |
| 6,095,275 | A | * | 8/2000 | Shaw ..................... B62K 13/00 180/185 |
| 6,199,646 | B1 | | 3/2001 | Tani et al. |

(Continued)

FOREIGN PATENT DOCUMENTS

| | | |
|---|---|---|
| EP | 1110851 | 6/2001 |
| EP | 1982904 | 10/2008 |

(Continued)

OTHER PUBLICATIONS

Netherlands Search Report dated May 8, 2015; Application No. NL 2014781.

*Primary Examiner* — Derek D Knight
(74) *Attorney, Agent, or Firm* — Young & Thompson

(57) ABSTRACT

Combination of a drive wheel and a gearbox for a continuous track system, the gearbox (1) comprising an annular input member (2) for connection to an end part (14) of a drive axle input member (16) and an annular output member (4) connected to the drive wheel (3), the annular input member (2) and annular output member (4) being coaxially arranged with respect to a longitudinal axis (6) of the gearbox (1). The combination further comprises an annular transmission unit (8) coaxially arranged with respect to the longitudinal axis (6) of the gearbox (1) and connecting the annular input member (2) and annular output member (4) through a gear ratio (R) of less than one, the gear ratio (R) being a ratio of an angular input velocity of the annular input member (2) to an angular output velocity of the annular output member (4).

17 Claims, 4 Drawing Sheets

(56) References Cited

U.S. PATENT DOCUMENTS

| | | |
|---|---|---|
| 6,318,200 B1 | 11/2001 | Coleman et al. |
| 8,632,138 B2 | 1/2014 | Bessette |
| 2014/0141917 A1 | 5/2014 | Demick et al. |

FOREIGN PATENT DOCUMENTS

| | | |
|---|---|---|
| JP | 2012183980 | 9/2012 |
| WO | 2012074624 | 6/2012 |

* cited by examiner

COMBINATION OF A DRIVE WHEEL AND A GEARBOX FOR A CONTINUOUS TRACK SYSTEM

FIELD OF THE INVENTION

The present invention relates to a combination of a drive wheel and a gearbox, in particular a drive wheel and a gearbox for a continuous track system.

PRIOR ART

US patent publication US 2014/0141917 discloses a final drive for a vehicle comprising a motor assembly, a planetary gear train and a drive sprocket. The planetary gear train may comprise a double reduction gear set reducing a rotational speed of an output shaft to the drive sprocket.

International publication WO 2012/074624 discloses a final drive assembly for a track system comprising a sprocket hub and a fixed hub defining an interior that houses a planetary gear set. A drive shaft extends from a machine body into a spline of a planetary gear assembly to cause rotation of the sprocket hub to drive a track chain of the track system.

European patent application EP 1 982 904 discloses a track assembly for moving a ground work vehicle comprising a drive sprocket of a track designed to be associated with a drive shaft. The drive sprocket is shaped so as to contain a protruding speed reduction unit connected to the drive shaft.

SUMMARY OF THE INVENTION

The present invention aims to provide an improved, compact gearbox for a drive wheel, in particular a combination of a drive wheel and a gearbox for a continuous track system, wherein said continuous track system is an exchangeable continuous track system removably mountable to a vehicle for temporarily changing wheels thereof. Vehicles equipped with the continuous track system comprising the combination of the drive wheel and the gearbox of the present invention are able to drive at higher speeds than existing prior art continuous track systems, such as when driving on regular roads.

The combination of the drive wheel and the gearbox does not require permanent modifications to gear arrangements and/or a transmission unit of the vehicle itself, so original gear arrangements and/or the transmission unit of the vehicle is maintained and the vehicle can be used with wheels as well as continuous track systems and their associated speed ranges.

According to the present invention, a combination of a drive wheel and a gearbox of the type defined in the preamble is provided, wherein the gearbox comprises an annular input member for connection to an end part of a drive axle input member and an annular output member connected to the drive wheel, the annular input member and annular output member being coaxially arranged with respect to a longitudinal axis of the gearbox; and an annular transmission unit coaxially arranged with respect to the longitudinal axis of the gearbox and connecting the annular input member and annular output member through a gear ratio of less than one, the gear ratio being a ratio of an angular input velocity of the annular input member to an angular output velocity of the annular output member.

According to the present invention, the combination of the drive wheel and the gearbox is readily mounted to e.g. a continuous track system wherein the gear ratio of less than one provided by the gearbox allows for a speed increase from a drive axle of a vehicle to the drive wheel of a continuous track system. In particular, a drive wheel or "rim" used for a continuous track system often has a smaller diameter than a regular drive wheel for use with a tyre. As a result, when exchanging regular drive wheels with continuous track systems having a smaller drive wheel, the maximum driving speed is significantly reduced when the transmission unit of the vehicle remains unaltered and/or no other gear arrangements are provided.

The combination of the drive wheel and the gearbox of the present invention fulfils a need to maintain the original transmission unit and/or gear arrangements of a vehicle and to provide a temporary "add-on" speed increasing gear ratio from a drive axle to a drive wheel. So when a vehicle is provided with continuous track systems comprising the combination of the drive wheel and the gearbox, the maximum driving speed of the vehicle is increased and substantially matches the maximum driving speed of the vehicle when using regular drive wheels. The vehicle can thus be used for both track-based and wheel-based driving modes without losing driving speed capabilities.

In an embodiment, the annular input member and annular output member have an identical direction of rotation during operation of the gearbox, allowing a transmission unit of a vehicle to be used in normal fashion as forward gearing remains associated with forward motion.

In an advantageous embodiment, the gearbox comprises a through bore coaxially arranged with respect to the longitudinal axis of the gearbox and extending through the annular input member, the annular output member and the annular transmission unit. Such a through bore extending through the gearbox allows an elongated end part of a drive axle to extend through the gearbox when necessary. This may be the case when a vehicle comprises a drive axle having e.g. a projecting portion beyond a connecting flange of the drive axle, wherein the connecting flange is to be affixed to the annular input member.

SHORT DESCRIPTION OF DRAWINGS

The present invention will be discussed in more detail hereinafter based on a number of exemplary embodiments with reference to the drawings, in which FIG. 1 shows an exploded view of an embodiment of an continuous track system fitted with a gearbox according to the present invention;

DETAILED DESCRIPTION OF EXEMPLARY EMBODIMENTS

Vehicles used in e.g. agriculture, such a tractors for example, typically use large drive wheels and tyres provided with a plurality of lugs. These large tyres provide improved traction in various soil conditions but tend to compress underlying soil excessively, which may adversely affect soil conditions for agricultural purposes. In order to minimize soil compression, yet allow for improved traction in many soil conditions, in particular wet soil conditions, a continuous track system can be used to replace or substitute wheels on one or more axles of the vehicle. The continuous track system provides a larger contact area and as a result provides improved traction to the vehicle and reduces soil compression.

One disadvantage of existing continuous track systems mounted to a vehicle such as a tractor is that the driving speed is often reduced to half the speed when driving with wheels. This may become problematic when driving on regular roads and participating in regular traffic.

Another disadvantage is that many existing continuous track systems often require permanent changes to gear arrangements and/or the transmission unit of the vehicle itself to allow for such continuous track systems to operate properly. However, permanently modifying gear arrangements and/or the transmission unit of the vehicle may reduce the vehicle's capability to drive with wheels, thereby reducing its versatility.

Yet another disadvantage of existing continuous track systems is that they are not readily mounted to vehicles having elongated or excessively long drive axles or output shafts, which would lead to continuous track systems projecting too far from the vehicle, which, in turn, could pose various problems with respect to e.g. road and safety regulations.

Figure 1:
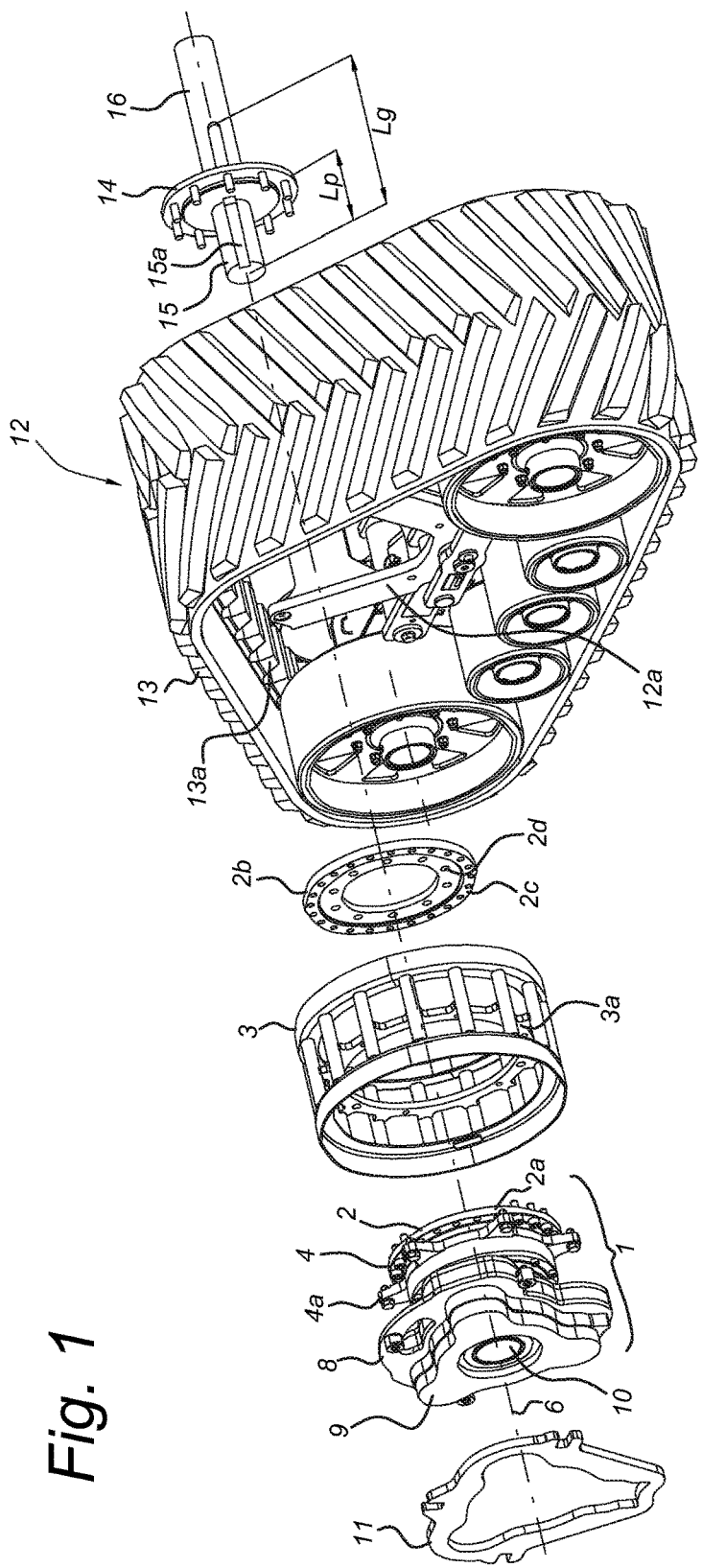

FIG. 1 depicts an exploded view of an embodiment of a continuous track system 12 fitted with combination of a drive wheel 3 and a gearbox 1 according to the present invention. In the embodiment shown, the gearbox 1 comprises an annular input member 2 for connection to an end part 14 of a drive axle input member 16 and an annular output member 4 connected to the drive wheel 3, the annular input member 2 and annular output member 4 being coaxially arranged with respect to a longitudinal axis 6 of the gearbox 1.

As shown, in particular embodiments the annular input member 2 and annular output member 4 may comprise an input attachment part 2a and output attachment part 4a respectively. The input attachment part 2a may be arranged to connect the annular input member 2 to an end part 14 of a drive axle input member 16 and the output attachment part 4a is connected to a drive wheel attachment part 3a of the drive wheel 3, thereby connecting the annular output member 4 to the drive wheel 3. In other embodiments the drive wheel attachment part 3a comprises a drive wheel flange disposed within the drive wheel 3 for connecting the annular output member 4 to the drive wheel 3.

In many embodiments the end part 14 of the drive axle input member 16 may be directly connected to the input attachment part 2a when possible. However, in some advantageous embodiments the input attachment part 2a may further comprise an adapting member 2b provided with two concentric arrangements of holes 2c, 2d, extending through the adapting member 2b, wherein the two concentric arrangements of holes 2c, 2d comprise different diameters. The adapting member 2b allows the input attachment part 2a of the annular input member 2 to be connected to the end part 14 of the drive axle input member 16 of a different size, e.g. a different diameter.

In an embodiment, the end part 14 may be adjustably positioned along an adjustment portion 15 provided with an elongated groove, slot or recess 15a of maximum length Lg. The groove 15a is longitudinally arranged along the drive axle input member 16 and allows the end part 14 to be freely positioned yet fixedly connected thereto. The adjustment portion 15 may project beyond the end part 14 over a projecting length Lp, wherein the projecting length Lp may vary between zero and the maximum groove length Lg. In some embodiments the end part 14 may be fixedly connected at some desirable projecting length Lp using a key member, e.g. a bolt, in clamping engagement with the groove 15a for preventing the end part 14 from spontaneously moving along the drive axle input member 16. In a typical embodiment the end part 14 comprises a connecting flange, wherein the connecting flange may slide to some suitable position at a projecting length Lp.

The gearbox 1 further comprises an annular transmission unit 8 coaxially arranged with respect to the longitudinal axis 6 of the gearbox 1 and connecting the annular input member 2 and annular output member 4 through a gear ratio (R) of less than one. The gear ratio (R) is defined as a ratio of an angular input velocity of the annular input member 2 to an angular output velocity of the annular output member 4.

According to the invention, the combination of the drive wheel 3 and the gearbox 1 for the continuous track system 12 as depicted in FIG. 1 has many advantages over existing continuous track systems. As mentioned hereinbefore, the gearbox 1 and drive wheel 3 allow vehicles to drive with continuous track systems at higher speeds compared to prior art continuous track systems due to the gear ratio (R) of less than one as provided by the annular transmission unit 8. The continuous track system 12 provided with the combination of the drive wheel 3 and the gearbox 1 is not only usable for unpaved conditions but also usable on regular paved roads because much higher driving speeds are attainable than previously possible with existing continuous track systems.

Since transmission units and/or internal gear arrangements of many agricultural and industrial vehicles often comprises sufficient reduction gear ratios to deal with difficult unpaved conditions, having another reduction unit for a drive wheel for a continuous track system is in many cases not necessary. However, existing continuous track systems typically reduce attainable driving speeds to about a half of what is normally possible with wheels, which is acceptable for driving in difficult unpaved conditions. On the other hand, for (semi) paved conditions higher driving speeds are often needed when participating in regular traffic or when unpaved condition do allow for higher driving speeds.

The combination of the drive wheel 3 and the gearbox 1 of the present invention thus provides a speed increase expressed by the gear ratio (R) of less than one, i.e. a rotational speed increase, so that the continuous track system 12 allows for higher driving speeds. In advantageous embodiments, the gear ratio (R) of the gearbox 1 is between 1/3 and 2/3.

In view of the above, the combination of the drive wheel 3 and the gearbox 1 of the present invention further addresses issues related to excessive loads on all-wheel or four wheel drive transmission units of vehicles such as tractors or other agricultural or industrial vehicles.

For example, replacing all wheels of e.g. a tractor with continuous track systems often imposes excessive loads on an all-wheel transmission unit of the tractor with respect to steering forces as well as different rotation speeds between the front and rear axles. However, by only replacing each rear wheel with a continuous track system 12 provided with the combination of the drive wheel 3 and the gearbox 1, whilst keeping the front wheels, all-wheel drive capability is still usable without subjecting excessive loads to the all-wheel transmission unit of the vehicle. In such a scenario the vehicle still benefits from higher traction and reduced soil compression offered by the continuous track system 12 but also benefits from higher driving speeds offered by the gearbox 1. The gear ratio (R) of the gearbox 1 may then be chosen to harmonize rotation speeds of the front wheels and continuous track systems 12 at the rear of the vehicle so that the all-wheel transmission unit of the vehicle itself is not subjected to excessive forces and wear.

In an advantageous embodiment, the annular transmission unit 8 is arranged such that the annular input member 2 and annular output member 4 have an identical direction of rotation during operation of the gearbox 1, i.e. an identical direction of rotation about the longitudinal axis 6. As a result forward gearing remains associated with forward motion and the transmission unit of the vehicle can be used in a normal fashion when the vehicle is temporality provided with continuous track systems.

In a further advantageous embodiment, the gearbox 1 further comprises a through bore 10 coaxially arranged with respect to the longitudinal axis 6 of the gearbox 1 and extending through the annular input member 2, the annular output member 4 and the annular transmission unit 8. The through bore 10 fully extends through the gearbox 1 and as such renders the gearbox 1 an annular gearbox 1. This embodiment is advantageous in view of an adjustment portion 15 as depicted in FIG. 1, wherein the end part 14 may be positioned at a projecting length Lp larger than zero. As such the adjustment portion 15 of the drive axle input member 16 may then extend at least in part through the through bore 10 of the gearbox 1, thereby allowing for a large variety of vehicles with various drive axles to benefit from temporarily mounting the continuous track system 12 without modifying the drive axle input member 16 and/or the end part 14 thereof.

To fixedly connect the gearbox 1 to the continuous track system 12, the continuous track system 12 may comprise a bracket member 11 for fixedly attaching the gearbox 1 to the continuous track system 12, thereby keeping the gearbox 1 stationary with respect to the continuous track system 12 for absorbing a driving torque imposed by the drive axle input member 16 while driving the vehicle. This embodiment thus facilities transmitting a torque from the annular input member 2 to the annular output member 4.

The bracket member 11 may be externally mounted to the continuous track system 12 for clamping engagement with the gearbox 1. In typical embodiments, the continuous track system 12 comprises a frame member 12a for connecting the bracket member 11 thereto. The frame member 12a may further comprise a frame attachment part to fixedly connect the continuous track system 12 to the vehicle in question.

In advantageous embodiments the continuous track system 12 comprises the combination of the drive wheel 3 and the gearbox 1 of the present invention. In further embodiments, the continuous track system 12 comprises a track 13 provided with a plurality of internal projections 13a for engagement with the drive wheel 3. In other embodiments the continuous track system 12 comprises a track 13 provided with a substantially flat internal friction surface for engagement with the drive wheel 3. So the drive wheel 3 may comprises a sprocket wheel or friction wheel.

Figure 2:
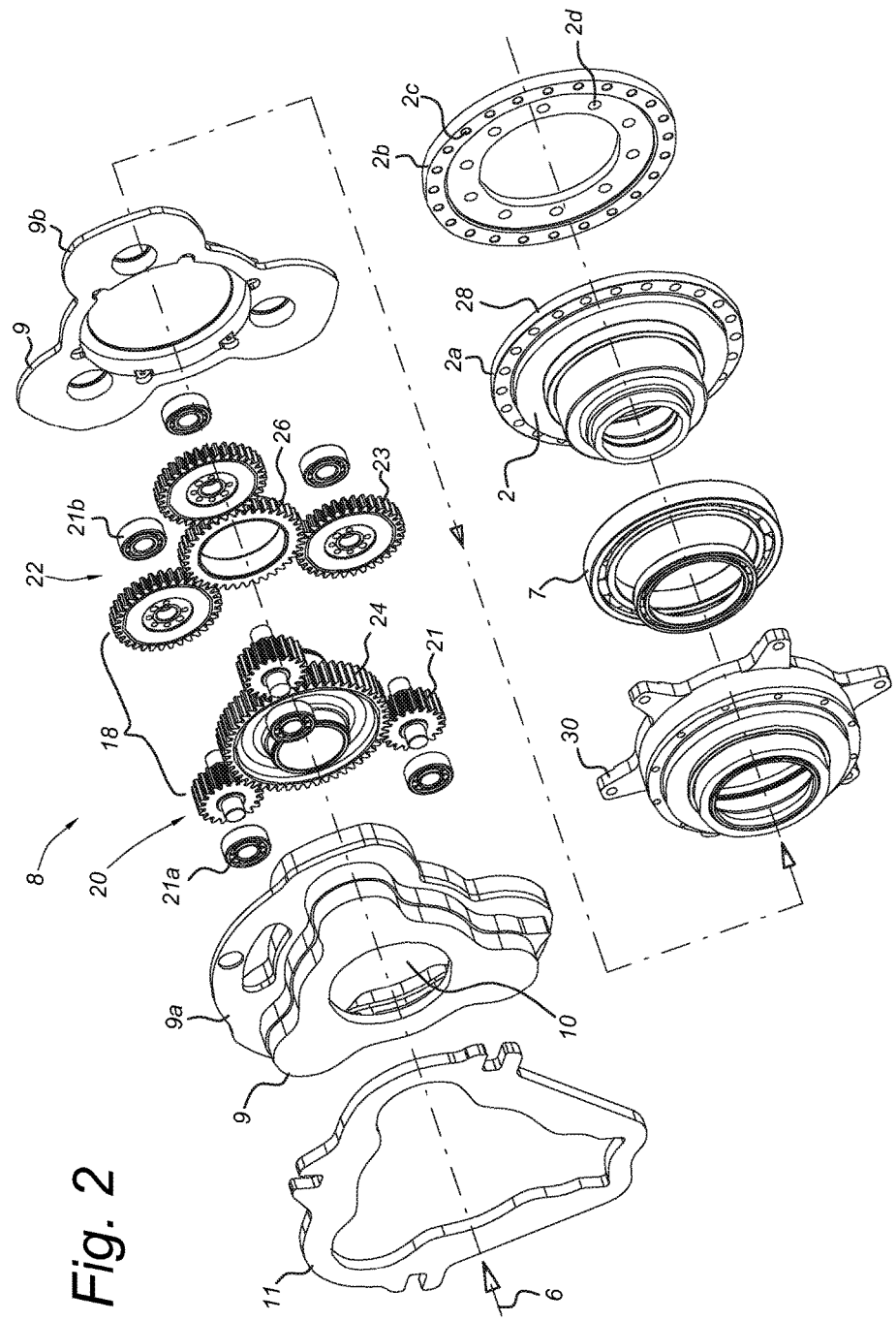
FIG. 2 shows an exploded view of an embodiment the gearbox according to the present invention.

FIG. 2 shows an exploded view of an embodiment of the gearbox 1 according to the present invention. In the embodiment shown, the annular transmission unit 8 comprises a compound annular planetary gear system 18 connecting the annular input member 2 and annular output member 4 through the gear ratio (R) of less than one. The compound annular planetary gear system 18 is coaxially arranged with respect to the longitudinal axis 6 and as a result also with respect to the through bore 10 extending through the gearbox 1. The compound annular planetary gear system 18 has the advantage of connecting the annular input member 2 to the annular output member 4 through a speed increasing gear ratio of less than one, but also to evenly distribute transmission forces within the annular transmission unit 8 due to an evenly distributed arrangement of the compound annular planetary gear system 18 about the longitudinal axis 6. Furthermore, higher speed increases from the annular input member 2 to the annular output member 4 can be attained by using the compound annular planetary gear system 18 as well as minimizing a form factor thereof compared to e.g. a single planetary gear set, thus obtaining a reduced size of the annular transmission unit 8.

In a further embodiment, the annular input member 2 is connected to a first annular planetary gear set 20 and the annular output member 4 is connected to a second annular planetary gear set 22. The first and second annular planetary gear set 20, 22 are interconnected through a first plurality of planet gears 21 of the first annular planetary gear set 20 and a second plurality of planet gears 23 of the second annular planetary gear set 22, wherein the first plurality of planet gears 21 are fixedly connected to the second plurality of planet gears 23.

Further, in an embodiment the annular input member 2 is attached to a first annular sun gear 24 of the first annular planetary gear set 20 and the second annular output member 4 is attached to a second annular sun gear 26 of the second annular planetary gear set 22.

This embodiment allows the annular input member 2 and annular output member 4 to have the same direction of rotation about the longitudinal axes 6 as a result of the rigidly connected first and second plurality of planet gears 21, 23, wherein the first plurality of planet gears 21 are in mesh with the first annular sun gear 24 and the second plurality of planet gears 23 are in mesh with the second annular sun gear 26. In the exemplary embodiment as shown, the first and second plurality of planet gears 21, 23 each comprises three gears positioned around the first and second annular gear set 24, 26, respectively. This allows a proper distribution of torque and forces in the annular transmission unit 8, as the three part set-up provides a self-centring effect, also allowing a simpler bearing structure.

To obtain a gear ratio (R) of less than one, thus a speed increase from the annular input member 2 to the annular output member 4, an embodiment is provided wherein each of the first plurality of planet gears 21 comprises a smaller pitch circle diameter than a pitch circle diameter of each of the second plurality of planet gears 23. This allows the first annular sun gear 24 to be larger than the second annular sun gear 26, yielding a gear ratio (R) of less than one. So in an embodiment the first annular sun gear 24 may comprise a larger pitch circle diameter than a pitch circle diameter of the second annular sun gear 26. This difference in pitch circle diameter allows for a speed increase instead of a reduction, thus a gear ratio (R) of less than one from the annular input member 2 to the annular output member 4.

In the embodiment shown in FIG. 2, it is further seen that the annular planetary gear system 18 is disposed in a casing member 9 of the annular transmission unit 8, wherein the casing member 9 comprises two shell casings 9a, 9b enclosing the annular planetary gear system 18.

The casing member 9 acts as a planet carrier, wherein the first and second plurality of planet gears 20, 22 are journaled within the casing member 9 of the annular transmission unit 8. Advantageously, a plurality of roller bearings 21a, 23a arranged within the casing member 9 provide reliable rotatable support for the first and second plurality of planet gears 20, 22 for journaled engagement with the casing member 9.

In most embodiments the bracket member 11 affixes the casing member 9 to the vehicle or to the continuous track system 12, so the casing member 9 does not rotate about the longitudinal axis 6 when the gearbox 1 is in use and a torque can be absorbed from the drive axle input member 16 to the annular output member 4. Since the first and second plurality of planet gears 21, 23 are journaled within the casing member 9, this imposes a non-epicyclical arrangement of the first and second plurality of planet gears 21, 23. That is, gear centres of each of the first and second plurality of planet gears 21, 23 do not revolve around the longitudinal axis 6 during operation of the gearbox 1. This is advantageous as the compound annular planetary gear system 18 need not comprise one or more ring gears, thereby reducing complexity of the annular planetary gear system 18 and allowing for a reduced form factor (i.e. reduced size of the annular transmission unit 8).

In the embodiment of FIG. 2, the annular input member 2 and annular output member 4 are coaxially arranged with respect to the longitudinal axis 6 and journaled for relative rotation. For example, a main bearing 7 may be interposed between the annular input member 2 and annular output member 4 for allowing relative rotation there between.

In a further embodiment, the main bearing 7 may be provided disposed around the annular input member 2 and within the annular output member 4. This embodiment allows for a compact arrangement of the annular input member 2 and annular output member 4 as well as relative rotation there between with a single main bearing 7.

The main bearing 7 also absorbs high loads during operation of the gearbox 1. That is, the main bearing 7 allows driving forces and torques to be absorbed by the annular input member 2 and annular output member 4, but the main bearing 7 also ensures coaxial alignment between the annular input member 2 and annular output member 4.

In a further embodiment, the annular input member 2 comprises an annular input flange member 28 and the annular output member 4 comprises an annular output flange member 30, the annular output flange member 30 comprises an output connecting diameter Do which is larger than an input connecting diameter Di of the annular input flange member (28). Due to the difference between the output and input connecting diameters Do, Di, the annular input flange member 28 and annular output flange member 30 can be closely arranged, side by side, without interfering when the gearbox 1 is connected to the drive wheel 3 and the end part 14 of the drive axle input member 16.

Figure 3A:
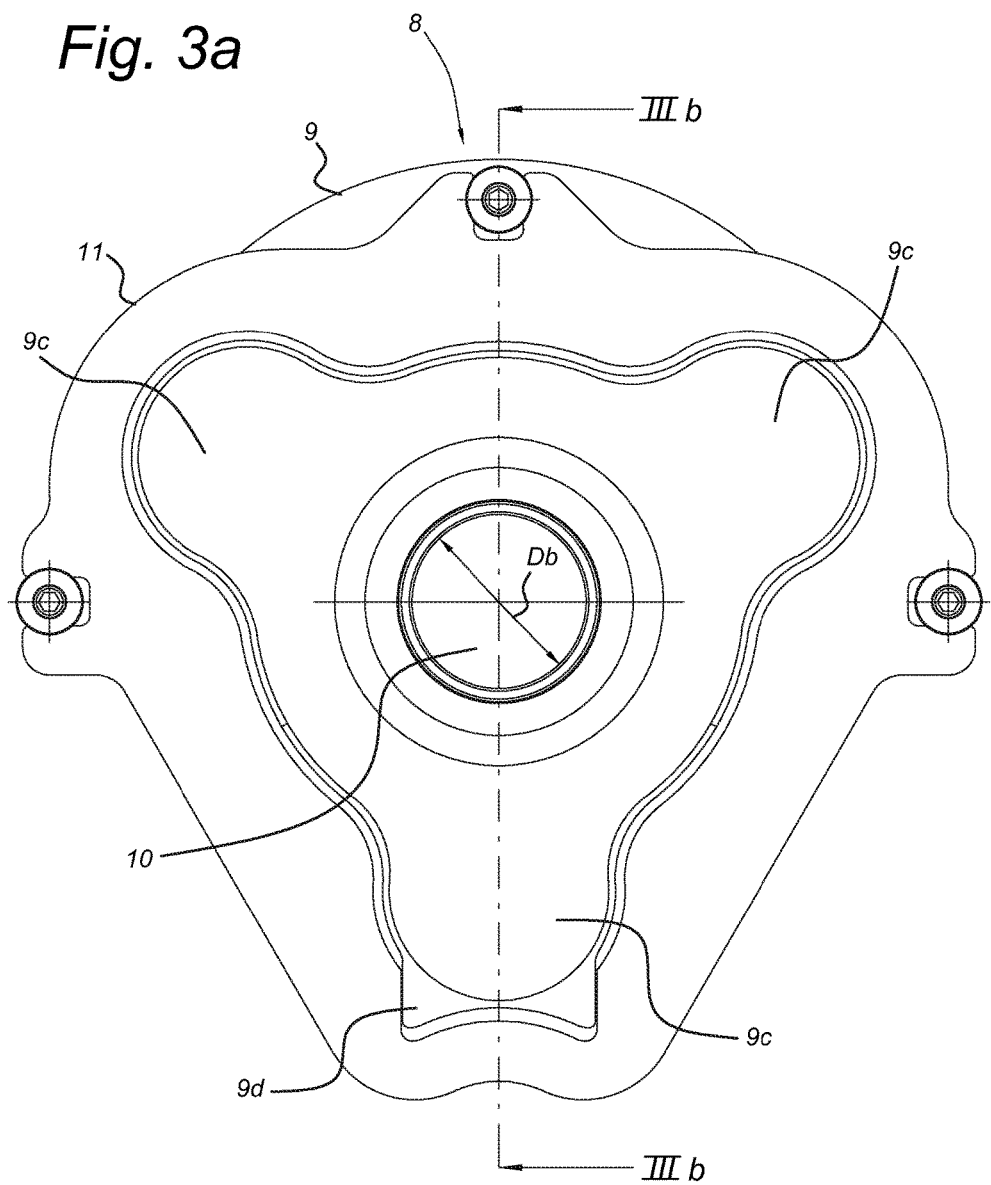
FIG. 3a shows a front view of an embodiment of the gearbox according to the present invention.

FIG. 3a shows a front view of an embodiment of the gearbox 1 according to the present invention. In the embodiment shown, the through bore 10 comprises an internal diameter Db. The through bore 10 allows the gearbox 1 to receive an elongated end part 14 of a drive axle input member 16. More precisely, some vehicles may comprise a drive axle having a protruding drive shaft, see e.g. the projecting length Lp of the adjustment portion 15 in FIG. 1. The gearbox 1 according to the invention allows for such a protruding drive shaft to extend through the through bore 10 so that the drive shaft does not need to be modified in order to be connected to the annular input member 2 of the gearbox 1.

In an embodiment, the casing member 9 may further comprise a plurality of recesses or projecting chambers 9c for accommodating the first and/or second plurality of planet gears 21, 23. Also, a casing attachment portion 9d may be provided to further affix the gearbox 1 to the continuous track system 12.

Figure 3B:
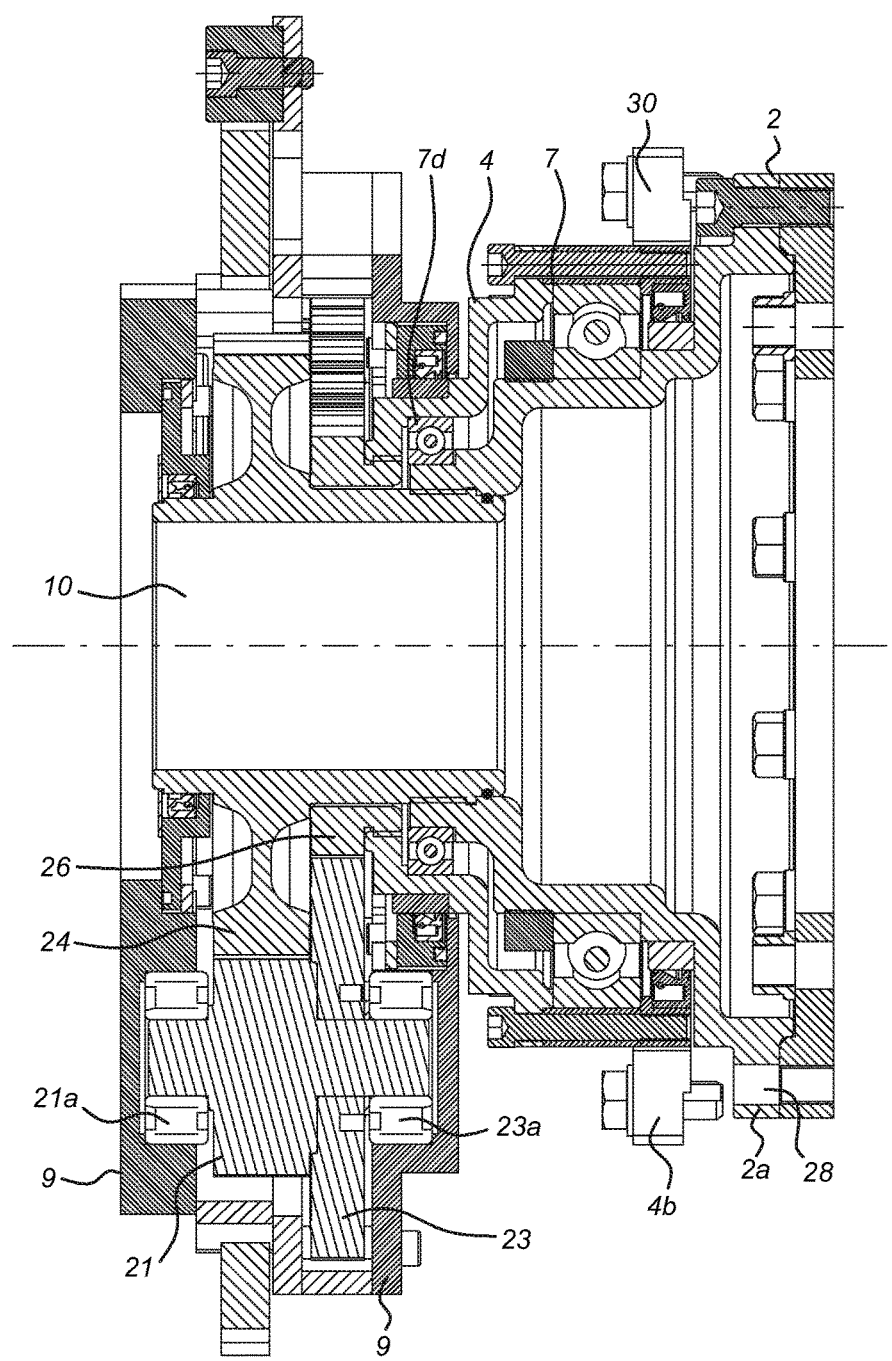
FIG. 3b shows a cross section of an embodiment of the gearbox according to the present invention.

FIG. 3b shows a cross section of an embodiment of the gearbox 1 according to the present invention. In the embodiment shown, the annular output member 4 is interposed between the annular input member 2 and the annular transmission unit 8. This embodiment allows for a compact arrangement of the gearbox 1 as the annular input member 2 is as close as possible to the end part 14 of the drive axle input member 16. This embodiment also facilitates the relative rotation between the annular input member 2 and the annular output member 4 as the main bearing 7 can positioned over the annular input member 2 and within the annular output member 4.

In specific embodiments a secondary bearing 7a may be provided for further rotational support between the annular input member 2 and annular output member 4. The secondary bearing 7a may have smaller dimensions than the main bearing 7. The secondary bearing 7a also facilitates coaxial alignment of the annular input member 2 and the annular output member 4.

From the embodiment of FIG. 3b it is seen that the annular input member 2 is disposed proximally to the end part 14 of the drive axle input member 16 and the annular transmission unit 8 is disposed distally thereto. This is advantageous as the annular transmission unit 8 may then be accessible externally from the drive wheel 3, e.g. from an open side thereof, in case the annular transmission unit 8 requires maintenance or servicing.

In the embodiment shown, a stepped planet gear arrangement of the first and second plurality of planet gears 21, 23 comprises a difference between the pitch circle diameter, i.e. wherein the pitch circle diameter of each of the first plurality of planet gears 21 is smaller than the pitch circle diameter of each of the second plurality of planet gears 23. As a result the compound annular planetary gear system 18 may be provided with a larger first sun gear 24 than the second sun gear 26, wherein the first and second annular sun gear 24, 26 define the gear ratio (R) of less than one, i.e. a speed increase from the annular input member 2 to the annular output member 4. The first and second plurality of planet gears 21, 23 may be journaled within the casing member 9 through the plurality of bearings 21a, 23a.

According to principles of the invention, when the gearbox 1 as depicted in the figures is in use, the annular input member 2 is actuated by an end part 14 of a drive axle input member 16 of a vehicle. Should the vehicle in question comprise an adjustment portion 15 wherein the end part 14 is positioned at some projecting length Lp larger than zero, a part of the drive axle input member 16 projecting beyond the end part 14 may be received in the through bore 10, so that the combination of the drive wheel 3 and the gearbox 1 can be positioned as close as possible to the vehicle. The through bore 10 thus avoids having to modify the end part 14 and/or the annular input member for engagement with the gearbox 1.

Further, as the annular input member 2 is being rotated, the annular sun gear 24 is rotated upon which the first plurality of planet gears 21 are rotated. The first plurality of planet gears 21 then transfer their rotation to the second plurality of planet gears 23, which, in turn, rotate the second annular sun gear 26.

The advantage of the annular transmission unit 8 of the present invention, in particular the annular planetary gear system 18, is that both the annular input member 2 and annular input member 4 may have the same direction of rotation during operation of the gearbox 1, so that forward gearing of the vehicle's transmission unit remains associated with forward motion. Furthermore, a gear ratio (R) of less than one imposes a speed increase from the annular input member 2 to the annular output member 4, so that higher driving speeds are possible compared to prior art continuous track systems.

A vehicle equipped with the continuous track system 12 provided with the combination of the drive wheel 3 and the gearbox 1 can utilize its own transmission unit in a normal way, i.e. all gear arrangements of the vehicle remain unaltered and are usable as would be the case when driving with regular wheels. As a result the vehicle remains versatile for both wheel based operations as well as continuous track based operations.

In a further aspect the present invention also relates to an exchangeable continuous track system 12 for replacing a drive wheel/tyre of a vehicle, such as a tractor, and the use of such an exchangeable continuous track system 12. The exchangeable continuous track system 12 comprises the combination of the drive wheel 3 and the gear box 1 as disclosed above and all embodiments thereof. In short, the exchangeable continuous track system 12 of the present invention may be summarised as:

An exchangeable continuous track system, comprising a gearbox 1 having an annular input member 2 for connection to an end part 14 of a drive axle input member 16 and an annular output member 4 connected to a drive wheel 3 of the exchangeable continuous track system 12, the annular input member 2 and annular output member 4 being coaxially arranged with respect to a longitudinal axis 6 of the gearbox 1. The exchangeable continuous track system 12 further comprises an annular transmission unit 8 coaxially arranged with respect to the longitudinal axis 6 of the gearbox 1 and connecting the annular input member 2 and annular output member 4 through a gear ratio R of less than one, the gear ratio R being a ratio of an angular input velocity of the annular input member 2 to an angular output velocity of the annular output member 4.

In an advantageous embodiment, the annular input member 2 and annular output member 4 have an identical direction of rotation during operation of the exchangeable continuous track system 12 and the gearbox 1 thereof. As explained earlier, this embodiment associates forward gearing of a vehicle's transmission unit to forward motion. The vehicle can thus be driven in a normal way.

In a further advantageous embodiment, the gearbox 1 of the exchangeable continuous track system 12 further comprises a through bore 10 coaxially arranged with respect to the longitudinal axis 6 of the gearbox 1 and extending through the annular input member 2, the annular output member 4 and the annular transmission unit 8. This embodiment of the exchangeable continuous track system 12 allows a drive axle input member 16 to project beyond the end part 14, wherein a projecting portion of the drive axle input member 16, e.g. the adjustment portion 15 at some projecting distance Lp larger than zero, may be received at least in part in the through bore 10. As a result, no modifications of the end part 14 and the gearbox 1 are needed for torque transmitting engagement there between.

The exchangeable continuous track system 12 may further comprise a bracket member 11 for fixedly attaching the gearbox 1 to the exchangeable continuous track system 12. The bracket member 11 allows the gearbox 1 to be affixed to a frame member 12*a* of the exchangeable continuous track system 12, so that a driving torque can be absorbed by the gearbox 1 and transmitted from the annular input member 2 to the annular output member 4.

By proper dimensioning of the exchangeable continuous track system 12, replacement on a single axle of a vehicle can be accomplished without the need for further adaptations to the drive system of the vehicle. The gear ratio can be properly selected to provide a small difference between a front axle and a rear axle of a all wheel drive vehicle, in order to prevent the vehicle from digging into the ground with the front wheels during operation (i.e. the front wheels having a slightly higher speed so that these will always tend to crawl out of soft ground). This allows to provide a better all terrain capability of a vehicle by just replacing the wheels on one axle by an exchangeable continuous track system 12, obviating the need to replace the wheels on all axles.

In view of the above disclosure, the present invention can now be summarized by the following embodiments:

Embodiment 1. Combination of a drive wheel and a gearbox for a continuous track system, the gearbox (1) comprising
an annular input member (2) for connection to an end part (14, 15) of a drive axle input member (16) and an annular output member (4) connected to the drive wheel (3), the annular input member (2) and annular output member (4) being coaxially arranged with respect to a longitudinal axis (6) of the gearbox (1); and
an annular transmission unit (8) coaxially arranged with respect to the longitudinal axis (6) of the gearbox (1) and connecting the annular input member (2) and annular output member (4) through a gear ratio (R) of less than one, the gear ratio (R) being a ratio of an angular input velocity of the annular input member (2) to an angular output velocity of the annular output member (4).

Embodiment 2. Combination according to embodiment 1, wherein the annular input member (2) and annular output member (4) have an identical direction of rotation during operation of the gearbox (1).

Embodiment 3. Combination according to embodiment 1 or 2, wherein the gearbox (1) further comprises a through bore (10) coaxially arranged with respect to the longitudinal axis (6) of the gearbox (1) and extending through the annular input member (2), the annular output member (4) and the annular transmission unit (8).

Embodiment 4. Combination according to any one of embodiments 1 to 3, wherein the annular transmission unit (8) comprises a compound annular planetary gear system (18) connecting the annular input member (2) and annular output member (4) through the gear ratio (R) of less than one.

Embodiment 5. Combination according to embodiment 4, wherein the annular input member (2) is connected to a first annular planetary gear set (20) and the annular output member (4) is connected to a second annular planetary gear set (22), the first and second annular planetary gear set (20,22) being interconnected through a first plurality of planet gears (21) of the first annular planetary gear set (20) and a second plurality of planet gears (23) of the second annular planetary gear set (22), wherein the first plurality of planet gears (21) are fixedly connected to the second plurality of planet gears (23).

Embodiment 6. Combination according to embodiment 5, wherein each of the first plurality of planet gears (21) comprises a smaller pitch circle diameter than a pitch circle diameter of each of the second plurality of planet gears (23).

Embodiment 7. Combination according to embodiment 5 or 6, wherein the annular input member (2) is attached to a first annular sun gear (24) of the first annular planetary gear set (20) and the annular output member (4) is attached to a second annular sun gear (26) of the second annular planetary gear set (22).

Embodiment 8. Combination according to embodiment 7, wherein the first annular sun gear (24) comprises a larger pitch circle diameter than a pitch circle diameter of the second annular sun gear (26).

Embodiment 9. Combination according to any one of embodiment 5 to 8, wherein the first and second plurality of planet gears (20, 22) are journaled within a casing member (9) of the annular transmission unit (8).

Embodiment 10. Combination according to any one of embodiments 1 to 9, wherein the annular output member (4) is interposed between the annular input member (2) and the annular transmission unit (8).

Embodiment 11. Combination according to any one of embodiments 1 to 10, wherein the annular input member (2) is disposed proximal to the end part (14) of the drive axle input member (16) and the annular transmission unit (8) is disposed distal thereto.

Embodiment 12. Combination according to any one of embodiments 1 to 11, wherein the annular input member (2) comprises an annular input flange member (28) and the annular output member (4) comprises an annular output flange member (30), the annular output flange member (30) comprising an output connecting diameter (Do) which is larger than an input connecting diameter (Di) of the annular input flange member (28).

Embodiment 13. Combination according to any one of embodiments 1 to 12, further comprising a main bearing (7) interposed between the annular input member (2) and annular output member (4) for allowing relative rotation there between.

Embodiment 14. Combination according to any one of embodiments 1 to 13, wherein the drive wheel (3) comprises a sprocket wheel or friction wheel.

Embodiment 15. Combination according to any one of embodiments 1 to 14, wherein the gear ratio (R) of the gearbox (1) is between 1/3 and 2/3.

Embodiment 16. Exchangeable continuous track system, comprising the combination of the drive wheel (3) and the gearbox (1) according to any one of embodiments 1 to 15 and a continuous track system (12) driven by the drive wheel (3).

Embodiment 17. Exchangeable continuous track system according embodiment 16, further comprising a bracket member (11) for fixedly attaching the gearbox (1) to the continuous track system (12).

Embodiment 18. Exchangeable continuous track system according to embodiment 16 or 17, utilized for replacing a wheel of a vehicle.

The present invention embodiments have been described above with reference to a number of exemplary embodiments as shown in and described with reference to the drawings. Modifications and alternative implementations of some parts or elements are possible, and are included in the scope of protection as defined in the appended claims.

The invention claimed is:

1. A combination of a drive wheel and a gearbox for a continuous track system, the gearbox comprising:
    an annular input member for connection to an end part of a drive axle input member and an annular output member connected to the drive wheel, the annular input member and annular output member being coaxially arranged with respect to a longitudinal axis of the gearbox;
    an annular transmission unit coaxially arranged with respect to the longitudinal axis of the gearbox and connecting the annular input member and annular output member through a gear ratio of less than one, the gear ratio being a ratio of an angular input velocity of the annular input member to an angular output velocity of the annular output member; and
    a through bore coaxially arranged with respect to the longitudinal axis of the gearbox and extending through the annular input member, the annular output member, and the annular transmission unit.

2. The combination of claim 1, wherein the annular input member and annular output member have an identical direction of rotation during operation of the gearbox.

3. The combination of claim 1, wherein the annular transmission unit comprises a compound annular planetary gear system connecting the annular input member and annular output member through the gear ratio of less than one.

4. The combination of claim 3, wherein the annular input member is connected to a first annular planetary gear set and the annular output member is connected to a second annular planetary gear set, the first and second annular planetary gear set being interconnected through a first plurality of planet gears of the first annular planetary gear set and a second plurality of planet gears of the second annular planetary gear set, wherein the first plurality of planet gears are fixedly connected to the second plurality of planet gears.

5. The combination of claim 4, wherein each of the first plurality of planet gears comprises a smaller pitch circle diameter than a pitch circle diameter of each of the second plurality of planet gears.

6. The combination of claim 4, wherein the annular input member is attached to a first annular sun gear of the first annular planetary gear set and the annular output member is attached to a second annular sun gear of the second annular planetary gear set.

7. The combination of claim 6, wherein the first annular sun gear comprises a larger pitch circle diameter than a pitch circle diameter of the second annular sun gear.

8. The combination of claim 4, wherein the first and second plurality of planet gears are journaled within a casing member of the annular transmission unit.

9. The combination of claim 1, wherein the annular output member is interposed between the annular input member and the annular transmission unit.

10. The combination of claim 1, wherein the annular input member is disposed proximal to the end part of the drive axle input member and the annular transmission unit is disposed distal thereto.

11. The combination of claim 1, wherein the annular input member comprises an annular input flange member and the annular output member comprises an annular output flange member, the annular output flange member comprising an output connecting diameter which is larger than an input connecting diameter of the annular input flange member.

12. The combination of claim 1, further comprising a main bearing interposed between the annular input member and annular output member for allowing relative rotation there between.

13. The combination of claim 1, wherein the drive wheel comprises a sprocket wheel or friction wheel.

14. The combination of claim 1, wherein the gear ratio of the gearbox is between 1/3 and 2/3.

15. An exchangeable continuous track system, comprising the combination of the drive wheel and the gearbox of claim 1 and a continuous track system driven by the drive wheel.

16. The exchangeable continuous track system of claim 15, further comprising a bracket member for fixedly attaching the gearbox to the continuous track system.

17. The exchangeable continuous track system of claim 15, utilized for replacing a wheel of a vehicle.

\* \* \* \* \*